United States Patent
Elder

(10) Patent No.: US 9,652,451 B2
(45) Date of Patent: May 16, 2017

(54) NATURAL LANGUAGE QUERY

(71) Applicant: Marvin Elder, Carrollton, TX (US)

(72) Inventor: Marvin Elder, Carrollton, TX (US)

( * ) Notice: Subject to any disclaimer, the term of this patent is extended or adjusted under 35 U.S.C. 154(b) by 278 days.

(21) Appl. No.: 14/273,302

(22) Filed: May 8, 2014

(65) Prior Publication Data

US 2015/0324422 A1 Nov. 12, 2015

(51) Int. Cl.
*G06F 17/30* (2006.01)
*G06F 17/27* (2006.01)
*G06F 17/28* (2006.01)

(52) U.S. Cl.
CPC ........ *G06F 17/279* (2013.01); *G06F 17/2785* (2013.01); *G06F 17/28* (2013.01); *G06F 17/3043* (2013.01); *G06F 17/30401* (2013.01); *G06F 17/30864* (2013.01); *G06F 17/30917* (2013.01); *G06F 17/30997* (2013.01)

(58) Field of Classification Search
CPC .... G06F 17/279; G06F 17/2785; G06F 17/28; G06F 17/30401; G06F 17/3043; G06F 17/30864; G06F 17/30917; G06F 17/30997; G06F 17/30734
USPC .......................................................... 707/722
See application file for complete search history.

(56) References Cited

U.S. PATENT DOCUMENTS

| | | | | |
|---|---|---|---|---|
| 6,263,335 B1* | 7/2001 | Paik | .................. | G06F 17/30707 |
| 6,282,537 B1* | 8/2001 | Madnick | ........... | G06F 17/30427 707/716 |
| 6,289,353 B1* | 9/2001 | Hazlehurst | .......... | G06F 17/3066 |
| 6,498,921 B1* | 12/2002 | Ho | ........................... | G09B 5/00 434/118 |
| 6,578,022 B1* | 6/2003 | Foulger | ............... | G06F 17/3064 706/11 |
| 6,816,857 B1* | 11/2004 | Weissman | ......... | G06F 17/30684 |
| 6,823,325 B1* | 11/2004 | Davies | .................. | G06F 17/271 706/50 |
| 6,986,104 B2* | 1/2006 | Green | .................. | G06F 17/2785 715/234 |
| 7,707,023 B2* | 4/2010 | Ejerhed | ................. | G06F 17/277 704/1 |
| 8,938,436 B2* | 1/2015 | Kozempel | ......... | G06F 17/30684 707/706 |
| 9,026,915 B1* | 5/2015 | Ehlen | ................. | G06F 17/30781 715/202 |
| 9,159,322 B2* | 10/2015 | Burke | ...................... | G10L 15/22 |
| 9,489,432 B2* | 11/2016 | Ehlen | ................ | G06F 17/30554 |
| 2003/0069877 A1* | 4/2003 | Grefenstette | ..... | G06F 17/30643 |
| 2004/0083092 A1* | 4/2004 | Valles | ................. | G06F 17/2785 704/9 |
| 2004/0122656 A1* | 6/2004 | Abir | .................... | G06F 17/2872 704/4 |
| 2004/0205448 A1* | 10/2004 | Grefenstette | ..... | G06F 17/30867 715/230 |

(Continued)

*Primary Examiner* — Sheree Brown

(57) ABSTRACT

The invention allows end users to obtain immediate, accurate information from structured databases without writing complex database query commands. The invention allows two different, but synchronized, methods of end user information requests: Spoken or typed Natural Language requests, and a Visual Request Specification method. Furthermore, the invention provides a user the means of "teaching the system the correct interpretation" when an information request was misunderstood by the invention's Natural Language Understanding module.

1 Claim, 11 Drawing Sheets

(56) References Cited

U.S. PATENT DOCUMENTS

| | | | |
|---|---|---|---|
| 2005/0043940 A1* | 2/2005 | Elder | G06F 17/3043 704/9 |
| 2005/0050042 A1* | 3/2005 | Elder | G06F 17/3043 |
| 2005/0154690 A1* | 7/2005 | Nitta | G06F 17/3061 706/46 |
| 2007/0067293 A1* | 3/2007 | Yu | G06F 17/30687 |
| 2007/0118551 A1* | 5/2007 | Akkiraju | G06Q 10/06 |
| 2009/0070322 A1* | 3/2009 | Salvetti | G06F 17/30616 |
| 2009/0094216 A1* | 4/2009 | Hou | G06F 17/30427 |
| 2009/0112796 A1* | 4/2009 | Elder | F16K 15/16 |
| 2009/0112835 A1* | 4/2009 | Elder | F16K 15/16 |
| 2009/0171925 A1* | 7/2009 | Elder | G06F 17/30654 |
| 2009/0192968 A1* | 7/2009 | Tunstall-Pedoe | G06N 5/02 706/47 |
| 2011/0307435 A1* | 12/2011 | Overell | G06F 17/278 706/46 |
| 2012/0016678 A1* | 1/2012 | Gruber | G06F 17/3087 704/275 |
| 2012/0150920 A1* | 6/2012 | Roulland | G06F 17/30734 707/805 |
| 2013/0041921 A1* | 2/2013 | Cooper | G06F 17/30672 707/780 |
| 2014/0379755 A1* | 12/2014 | Kuriakose | G06F 17/3043 707/780 |

* cited by examiner

800

User enters Natural Language (NL) Request — 810

System sends NL Request to List of Cooperative Disparate Database Systems — 820

830

Each Participating Database System sends its Answer to Staging Area — 840

Staging Area
Answers from Participating Systems are collated into a single Answer and returned To User — 850

NATURAL LANGUAGE QUERY

CROSS-REFERENCE TO RELATED APPLICATIONS

This application is related to Provisional Patent Application No. 61/820,837, Title of Invention: NATURAL LANGUAGE QUERY, Listed Inventors: Marvin Elder, Carrollton, Tx (US), Filing Date: 8 May 2013.

This application is also related in part to patent application Ser. No. 10/923,164, Filed: Aug. 20, 2004, Title of Invention: PREPARING A DATA SOURCE FOR A NATURAL LANGUAGE QUERY, Inventor: Marvin Elder, Carrollton, Tx (US), the Status of which is "Abandoned—Failure to Pay Issue Fee". An Information Disclosure Statemet (SB08a) is included in this application, which cites the relevant parts of this previous patent application, but to summarize the relevant cross-reference relationship of the present application to this previous application, the final claims of the previous application were awarded patent status by the examiner, Linh Black, and thus represent a Prior Art embodiment of Natural Language Query, due to this previous application's Abandoned Status. All of the present application claims are new and novel "improvements" in the field of Natural Language Query, and do not overlap or supersede claims of the said preceding patent application; however, the present application may have an embodiment that utilizes an "open source" taxonomy, now called OntoloNet, that was part of the previous patent application, and the present applicant cites "Hierarchical Ontologies" (OntoloNet) as "such parts as necessarily cooperate with it or as may be necessary to a complete understanding or description of it" (quoted from 37 C.F.R 1.71, paragraph c").

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The present invention employees processes from two fields of endeavor, the first being Natural Language Processing (NLP), and more particularly Natural Language Database Query, which attempts to convert a user's information request entered either vocally, verbally or visually, usually on a browser or mobile device, into a database query command to provide exact answers.

The present invention is also in the field of endeavor of Business Intelligence (B.I.), which employs "database savvy" Information Technology (I.T.) specialists to write database query commands by hand to retrieve desired information to an organization's users.

The two fields of endeavor cited above share a common goal: retrieve desired information from data sources in a timely and accurate manner. Systems and processes in both fields of endeavor face problems that often prevent them from accomplishing their goal, explained below.

In the case of B.I., the labor-intensive approach of having data-savvy I.T. Professionals write query programs by hand takes time: usually hours or days, and thus is not an acceptable approach for returning immediate answers to ad hoc user requests. The era of mobile devices has brought great pressure on organizations to provide immediate answers for their users using Natural Language requests.

The field of NLP, particularly through Speech To Text (STT) software on mobile devices, has its own set of problems. Since current products based on Natural Language user inputs, such as search engines, produce multiple links to documents and other unstructured information sources, they are not generally suitable for extracting "exact answers" and analytics.

The narrower field of Natural Language Data Search also has problems that go back to the early products of this type, introduced in the 1960s and 1970s. One problem was that they worked with only a few database sources. The main problem, though, was that they failed to get correct answers in a great majority of user attempts. As is always the case, if a system or product doesn't produce satisfactory results it's users will quickly abandon it, which is what happened: none of these early products exists today.

Some user goals are so persistent, with a demand so great, that entrepreneurs will keep trying new solutions to meet these user demands. Because of the immense surge in mobile devices, users are even more demanding of systems that will return immediate, direct answers to their information requests. This demand has resulted in the recent product releases of Natural Language Data Search products, namely IBMs' Watson, Apple's siri, and Microsoft's new Power BI product.

Despite these recent Natural Language ("NL") product announcements, the age-old problem still exists: siri, for example, has a success ratio of only 20% to 30% in getting correct answers from databases, and Google, Bing, Wolfram Alpha and other leading search products have similarly poor ratios of success per user request. The main reason for the overall poor success ratio of Natural Language Query products is, and has always been, that there are many ways to ask for the same fact, and Natural Language "Understanding" methodologies have so far proved incapable of understanding a sufficiently high ratio of user requests.

SUMMARY OF THE INVENTION

The present invention is a Natural Language Database Query product, named Natural Language Query (alias "NLQuery"). The product is in its beta test stage. This product, like most of its class of product, attempts to understand a user's request and convert its phrases into a database query and return a correct answer to the user. A novel and useful invention feature employs a "fallback" process not found in competing NL Query products: in case a request fails, it is captured in a database table of UserQuery objects, along with its request phrases and "failure reason".

Then an "admin" (power user) utilizes the invention's "teach the system" method of creating a successful end user request and submits that "semantically equivalent" request and its phrases and concepts to a taxonomy of ontologies (OntoloNet), which thus becomes more knowledgeable about user requests in the future and rapidly increases the invention's "success ratio" of requests.

So the invention's "novelty and usefulness" should be judged by its ability to overcome the inability of semantically understanding all the ways of posing a question—by offering a simple method of allowing non-technical users to employ a "manual" way to get the correct answer to a class of questions and attaching this "correct-answer" alternative as being "semantically equivalent" to the failed request. To the extent that the invention succeeds with this divide and conquer approach the more useful it is to its users.

The invention in its most exemplary embodiment is a Distributed System with a Server-Side code base written in Java, and a set of JSPs and JavaScript pages that reside on client Browsers. Much of the system interface calls between the "server side" and the "client side" are through AJAX calls. All of the invention's software code base was written by the inventor or by his cofounder; however, the invention stores its ontologies in an open-source taxonomy, currently OntoloNet but optionally some other open-source taxonomy such as Schema.org, OpenCyc or other such open-source repositories, and these third-party open-source repositories are referenced by name where appropriate in the drawings.

DRAWINGS (11)

DESCRIPTION OF THE DRAWINGS

Figure 1:
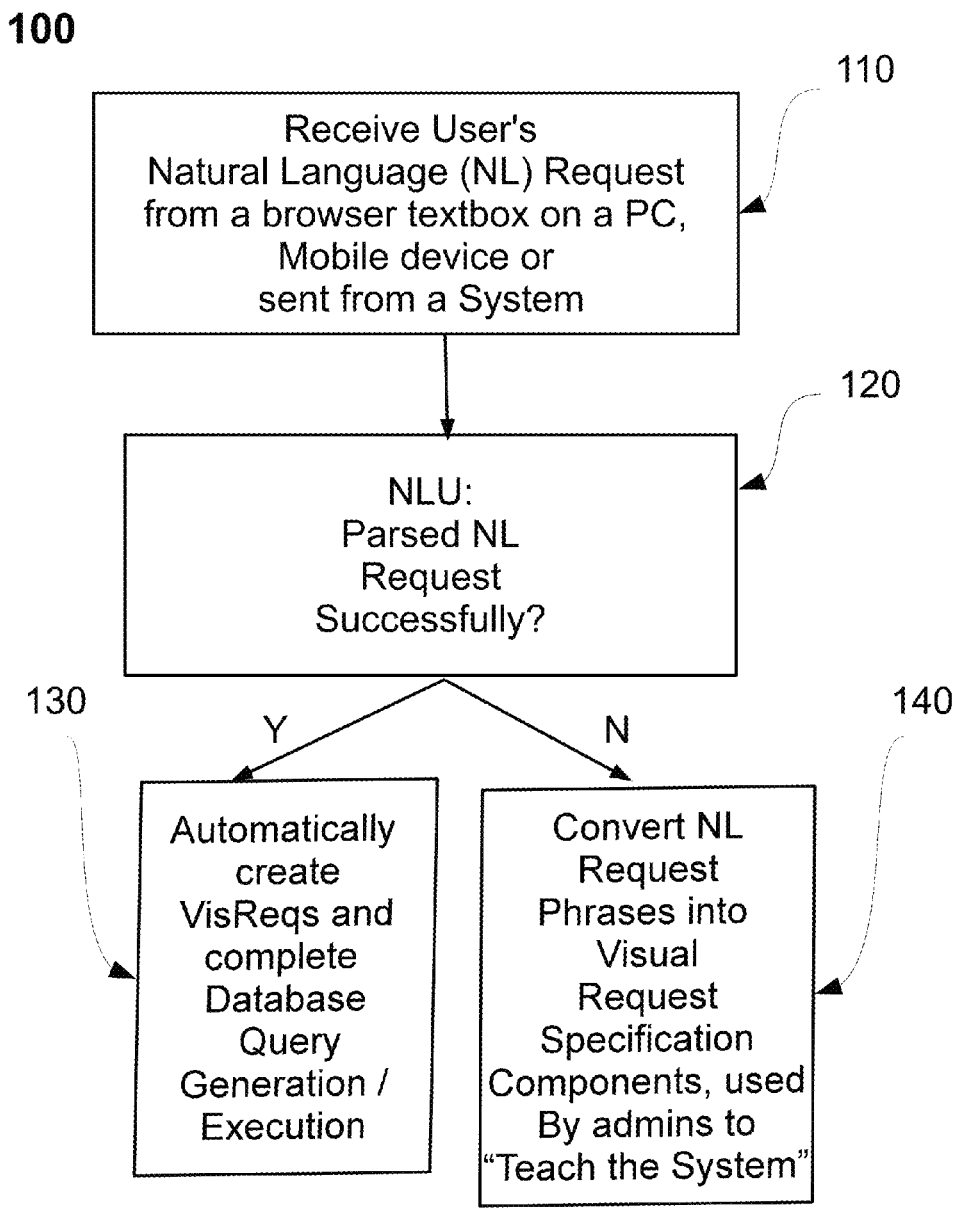
FIG. 1 (100) Receiving a User's Natural Language Request, parsing it with the system NLU and either automatically creating VisReqs components and automatically converting the NL Request into a Database Query or transforming the request phrases into the system's Visual Request Specification UI module for admins to "Teach the System" a semantically equivalent successful query.

FIG. 1 (100) The invention begins its "round-trip" mission of transforming a User's Natural Language (NL) Request into a Database Query by receiving a user request. (110) The System receives the user's Natural Language (NL) Request, typically entered by a user on his or here browser (on a PC, tablet or mobile device).

(120) The system's first module, its Natural Language Understanding (NLU) unit, attempts to parse the various phrases in the NL Request. (130) If the NLU "recognizes" all the phrases in the NL Request, it routes the Phrase Objects to a Visual Request Specification UI (VisReqs) module as a "automatic round-trip" method, first by automatically performing the VisReqs methods and then automatically generating an Database Query command and executing it against the target database and then returning a formatted answer to the user's browser as a "Grid" of rows and columns.

(140) The Visual Request Specification UI module allows users with "administrator" privileges ("admins") to drag-drop Data Objects (Entities and Attributes, mapped directly or indirectly to Database tables and columns) from an Object Tree of the virtualized tables and columns in the database or subject area model into the UI's two VisReqs Panels, "Selected Items" and "Filtered Items". The UI has a textbox where the User's Natural Language Request is entered manually by an Admin, or which is placed automatically from the NLU. The two panels also allow "aggregation functions" (such as Count, Sum, Avg) for each Item.

By comparing the text in the NL Request with the entities and attributes in the Selected Items panel and Filtered Items panel, a user can sight-verify that the selected and filtered items represent a "Visual Request Specification" (herein called "VisReqs") of the NL Request. Once the VisReqs items are sight-verified, an admin can press a "Get It" button and trigger the processes of Database Query Generation/Execution. The invention's Visual Requirements Specification feature is in itself a major Business Intelligence breakthrough, because it allows a non-technical user to "automatically" create Database Query commands (e.g, SQL commands) that without the invention would require a Database-savvy I.T. Professional to write the SQL commands manually.

Figure 2:
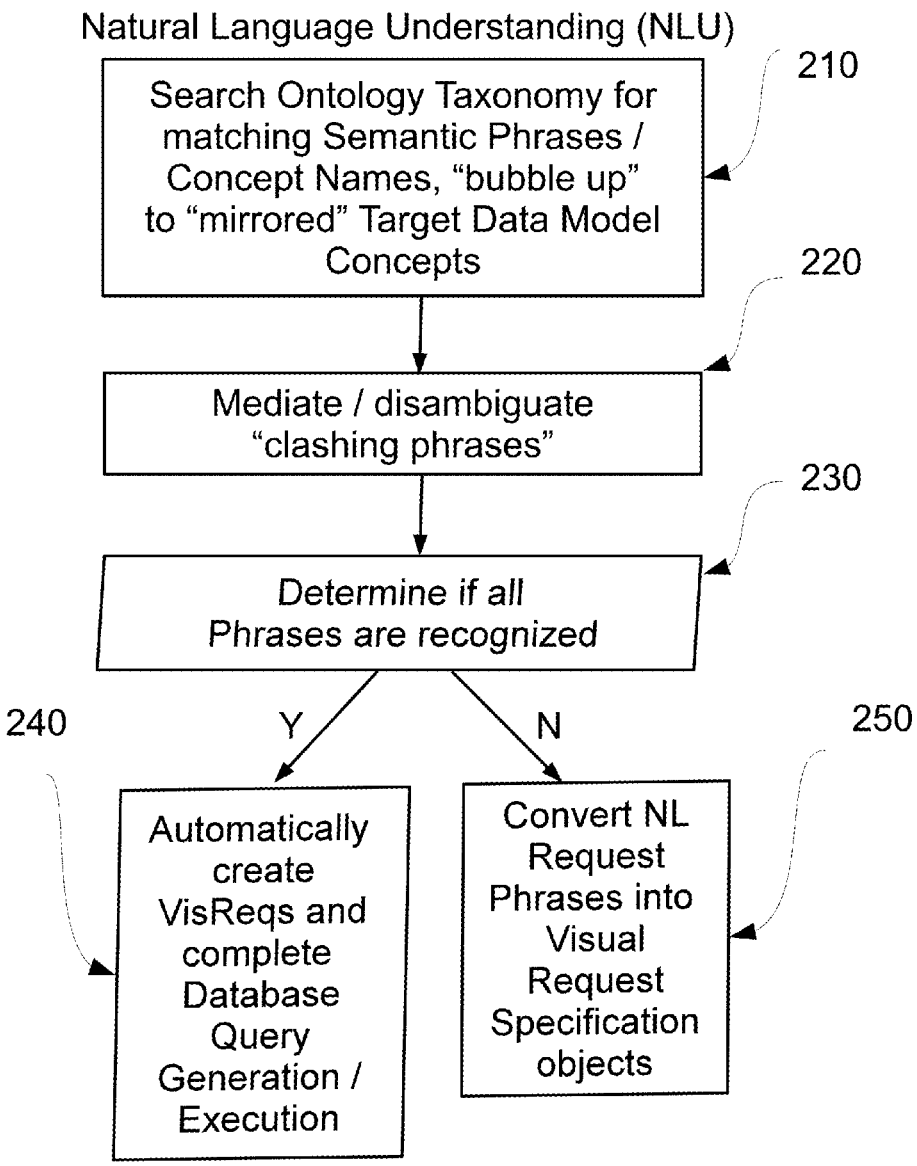
FIG. 2 (200) The system's Natural Language Understanding (NLU) module

FIG. 2 (200) The System's Natural Language Understanding (NLU) module. In 210, the System's Natural Language Understanding (NLU) module receives the user's Natural Language (NL) Request, typically entered by a user on his or here browser (on a PC, tablet or mobile device). The NLU searches through the System's Ontology Taxonomy (currently the public domain source "OntoloNet", attempting to match Request phrases to Semantic Phrases or Concept names. If matching semantic or concept objects are found, the System utilizes an Inferencing algorithm to "bubble up" these found objects to the top-level Ontology that "mirrors" target data model concepts.

In 220 the NLU then attempts to "disambiguate" or mediate "clashing phrases". For instance, a Customer Entity may have a "name" attribute (Customer.name), and the Employer Entity likewise may have a "name" attribute (Employer.name). In 230, the NLU determines whether all Request phrases are recognized (successfully parsed), and invokes one of two subsequent processes: if all Phrases are recognized, the "automatic round-trip path is chosen; if not all Phrases are recognized the Visual Request Specification UI is invoked.

In 240, the NLU has determined that all NL Request phrases are recognized, and invokes the "Automatic" process path, first performing VisReqs drag-drop operations, then completing the Database Query Generation and Database Query command execution, returning the answer to the user. In 250, not all NL Request phrases were recognized, so the NL Request phrases that were recognized by the NLU are converted into VisReqs components and sent, along with the Unrecognized Phrases to the Visual Request Specification UI or alternatively saved for future "Teach the System" action by an admin.

Figure 3:
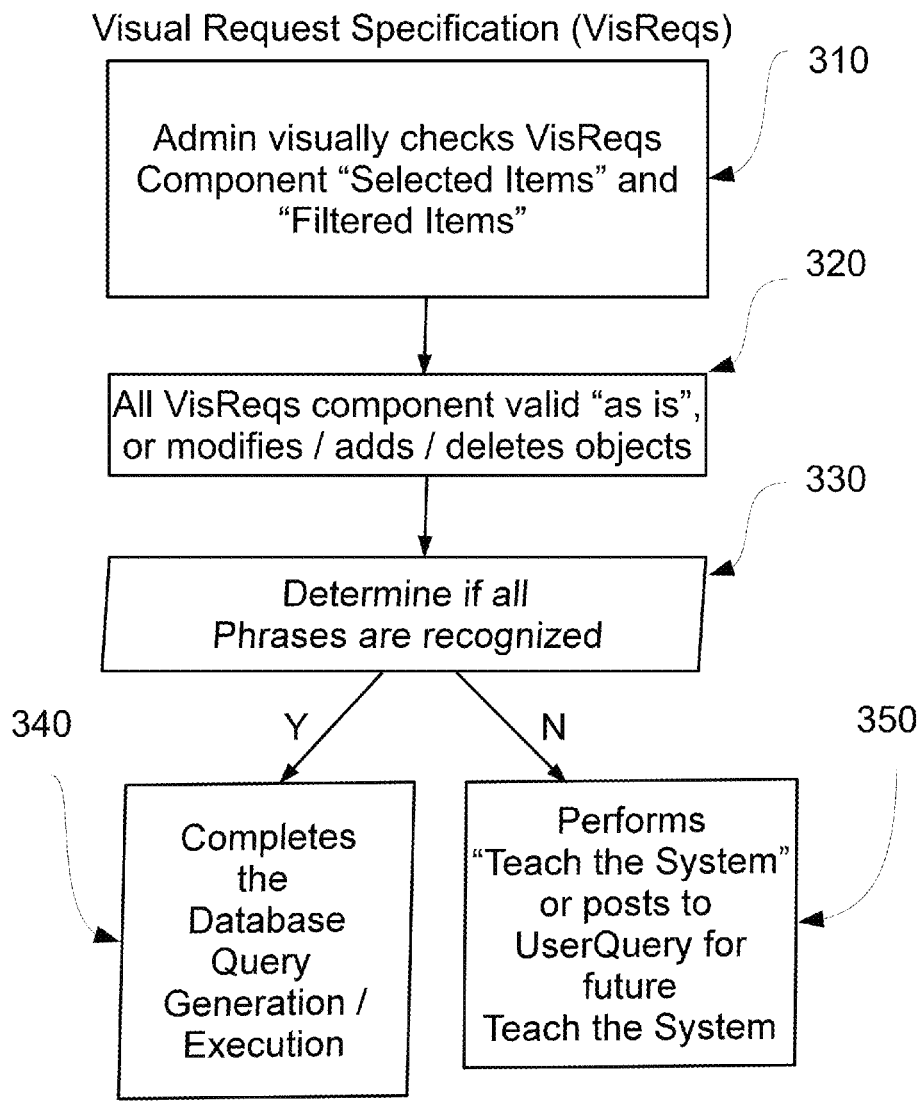
FIG. 3 (300) The multi-step process with an admin, either validating the VisReqs and invoking the process of creating and executing a Database Qyer, or "Teaching the System".

FIG. 3 (300) The Visual Request Specification feature. In (310) an admin (usually a "power user") uses the Visual Request Specification (VisReqs) UI to manually create VisReqs components ("selected items" and filtered items" drag-dropped from an Object Tree consisting of Entity/Attributes and Dimension Values)

In 320, menu-driven features are described whereby the admin can modify or add/delete "Virtual Entities" and "Virtual Attributes". Other options include adding/modifying Calculated Fields, adding/modifying Synonyms to Entities, Attributes and Dimension Values, changing the names of Entities or Attributes—but not the Entity ID or Attribute ID, which always is mapped one to one to a table or column in the Database for "non-virtual" objects. Virtual objects are recursively mapped to "parent" objects to get to the first "non-virtual" parent object. In 330. the admin can either invoke the Database Query Generation/Execution process or, if the NL Request included "Unrecognized" phrases, the admin can either perform the "Teach the System" process or post a UserQuery for future "Teach the System" processing, perhaps by a different admin or volunteer user.

In 340 (All phrases recognized), the admin can press a button invoking the processes to complete the Database Query Generation/Execution phase. Note that the ability to "automatically" (or semi-automatically, after Setup), shows the invention as being a "true end user query tool", because all the user had to do was drag-drop objects from the Familiar Concept Object Tree to form a Visual Requirements Specification. The invention's automatic JOIN clause algorithms completed the SQL command. In 350 (Some phrases unrecognized), the Unrecognized Phrases are highlighted in a "Yellow Box" to alert an admin that the request "failed" with the highlighted unrecognized phrase. An admin can invoke the "Teach the System" process, or post a UserQuery for future Teach the System processing.

Figure 4:
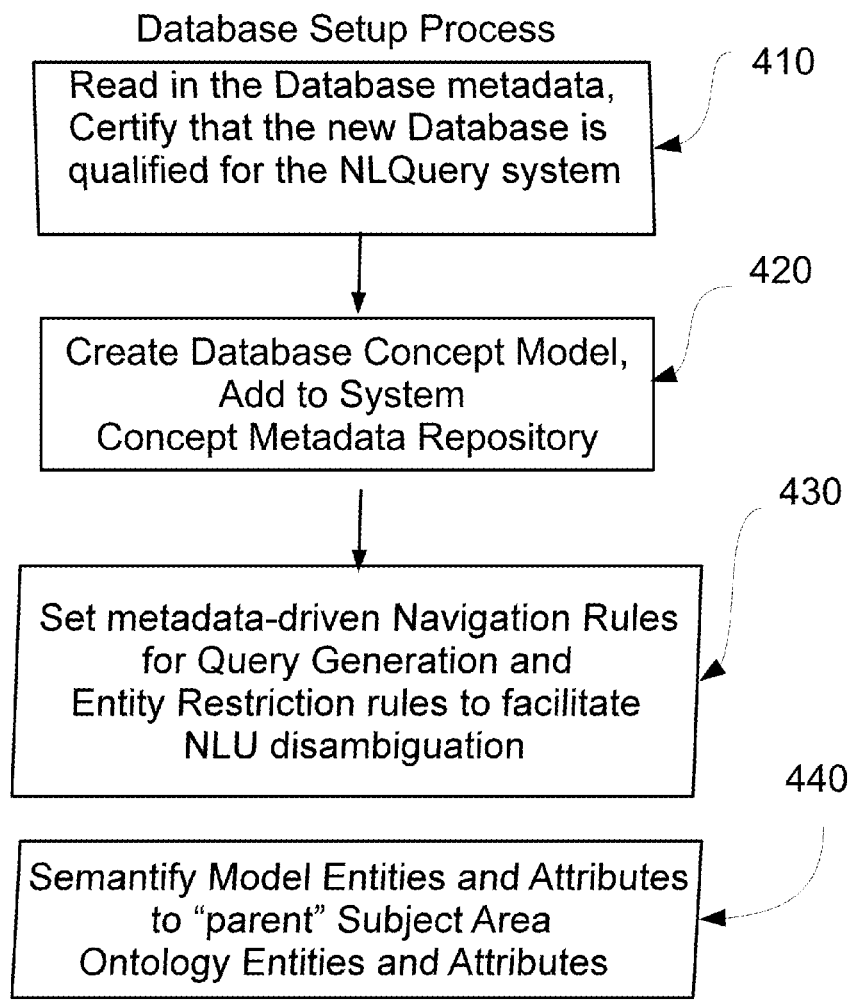
FIG. 4 (400) The system's Setup Process, includes certifying the suitability of the database to work with the invention, creating a new Data Concept Model and mapping its metadata objects to parent Subject Area ontology objects.

FIG. 4 (400) The Database Setup Process. New client databases, called "Target databases", are read into the System's Metadata repository through a Java Interface/implementation called DatabaseMetadata (410), which captures all facets of a relational database, including table and column names, column data types and other column attributes, indexes, and (if they exist in the database) Foreign Key constraints. The Setup Process performs Database Quality Certification tasks and Join Certification tasks, looking for certain "certification violations": (a) tables with zero rows; (b) tables with no Foreign Key references (i.e., stand-alone tables), etc. Entity Relationships are also certified, determining whether "orphan" rows exist, excessive "null Foreign Key values", etc. The Certification process also allows a System admin, together with the client organization's "Database Owners", to spot normal form violations, such as repeating groups. The admin/database owner can eliminate "problem tables" by moving them to a "private view" of the new Database Model (not deleting them from the database itself, which is kept in "read only" mode).

In 420 a "Database Model" is created for each new Database, along with a "MAIN" Model View within the System's Concept Metadata repository. All references to the actual database tables and columns are "virtualized" into Entities and Attributes, so that "user friendly" names can be set for the database objects. In 430, the setup process also provides several "Task Tabs" besides the Entity Table tab and the Entity Relationship tab (used to perform the Database Quality Certification tasks described above). Such task tabs allow "Navigation Rules" and "Entity Restriction Rules" to be set for JOIN-clause Database Query generation and to facilitate NLU disambiguation. In 440, one other task tabs provides an important system function: the "parenting" of the database tables and columns to selected Ontology Entities and Attributes.

Figure 5:
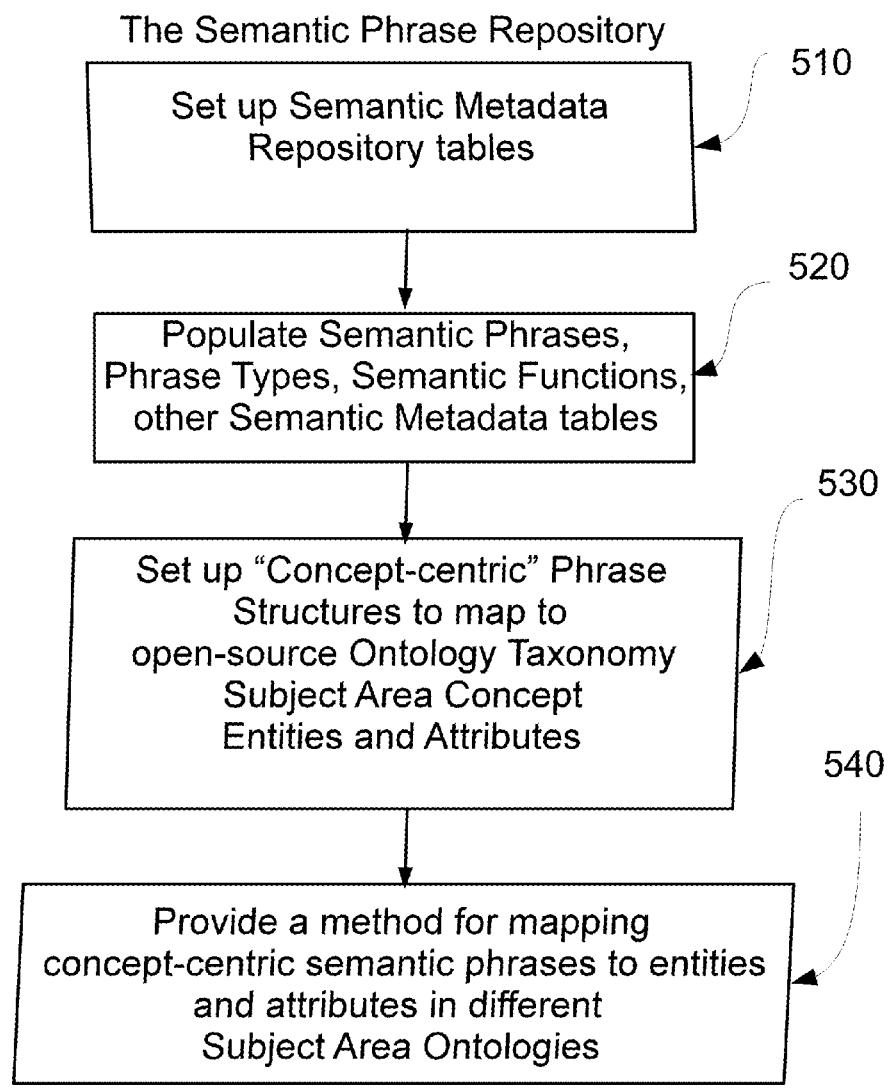
FIG. 5 (500) The Semantic Phrase metadata repository, including mapping "Concept-centric" semantic phrases to Subject Area Ontologies to enrich the Ontologies by including both concepts and semantic phrases, and providing "cross-Subject Area Entity/Attribute mapping".

FIG. 5. (500) The Semantic Phrase metadata repository. In 510, the reason for setting up SemanticMetadata Repository tables is explained. Grammatically separating phrases into parts of speech, all human languages contain nouns and other non-noun phrase types, such as verbs, adverbs, prepositions and other parts of speech. Since the object of the system's NLU parsing is to "recognize phrases", it must recognize both nouns and non-nouns, although an artifact of Database Query commands is that they consist of a First-Order Predicate Logic (FOPL) that analytically works with nouns and values, but few "verbs" other than ORDER BY and GROUP BY. The SQL command clauses are "SELECT" (attributes/columns), which are nouns, "FROM" (entities/tables, which are nouns), "WHERE" (attributes/columns) <relational operator>, which are symbols (=, <, >, etc.) which have Natural Language word or phrase counterparts ("equals", "more than", "less than", etc.). But a user's NL request will include non-noun "semantic" phrases, in sentences like "Employees who sold more than a thousand dollars of Seafood products last month", which contains only two noun=phrases ("Customers" and "Seafood products"). Note that sentences or sentence fragments usually contain a Subject Entity/Attribute (noun), a verb or preposition, then followed by a Predicate Entity/Attribute. The example sentence above can be distilled down to "((Employee)) sells/sold ((Category)) ((Product))". This pattern is called an "Action Phrase" in the System.

In 520 it is explained that the system's SemanticMetadata consists of an Ontology that is includes purely Semantic Phrase objects, which are hierarchical in nature. Here all "non-Concept Noun" phrases are stored, including all grammatical phrase types such as Articles, Prepositions, Verbs, Adverbs, etc.). In 530 the SemanticMetadata Repository also includes entities and attributes in which "Concept-centric" objects are populated. The system uses an open-source Ontology Taxonomy ("OntoloNet") which includes thousands of phrases, both Semantic Phrases and "Concept-centric" Phrases. The NLU searches throughout the whole Taxonomy to match NL Request phrases.

In 540, a "bubble up" process of inferencing is explained. The phrases in OntoloNet which match a user's NL Request phrases must link through inferencing to a set of entities and attributes in a top Ontology which "mirror" the Systems's ConceptMetadata phrases, so that a Database Query can be constructed. The system provides a powerful feature that allows the NLU to match Action Phrases wherein an Entity or Attribute found in one Ontology may be mapped to an Entity or Attribute in another Ontology, with the caveat that the two Ontology objects must be linked through direct or indirect Parent/Child hypernomic ("is-a") inferences.

Figure 6:
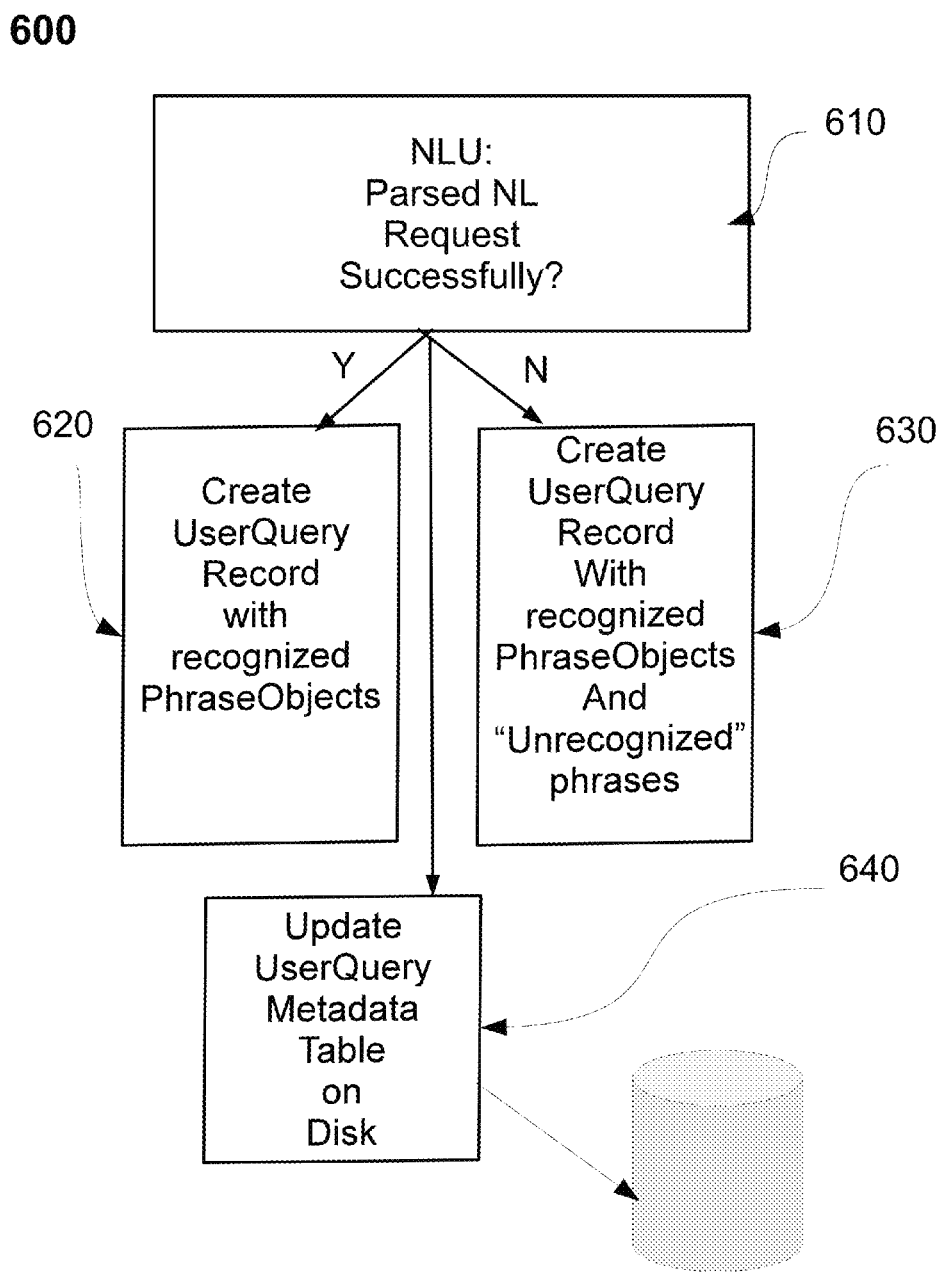
FIG. 6 (600) Creating and updating the UserQuery table with every attempted Request together with its Request Status Code.

FIG. 6. (600): UserQueries and their purpose. In 610 it is explained that he NLU, in its parsing of a user's NL Request, will most likely find matching phrases in the Ontology Taxonomy, which includes a growing number of Semantic and Concept phrases. Every User NL Request is captured in a "UserQuery" table in the ConceptMetadata repository, whether the NL Request was "fully understood" (all phrases recognized) or not.

620: If all phrases were parsed successfully, the UserQuery record will have a "Result Status Code" of "100". Note that later in the process of generating a Database Query and executing the Query Command against the target database(s), the Result-set will either return a Result-set of rows from the database tables, or it may result in 'zero rows' (usually because a Filter is set too "high", for example "with Sales over one million dollars" and where the maximum Sales value is less than that filter amount. Successful queries will update the UserQuery Result Status Code to reflect its success, and unsuccessful queries will update the Result Status Code to indicate that the query "ran" but resulted in zero rows.

630: If the NLU was not successful there will be "Unrecognized" NL Request phrases, so no Query Generation/Execution process will be invoked. Instead, the UserQuery is created with a Result Status Code indicating the NL Request "failed", and is now a candidate for an admin to select from the Failed UserQuery list and use the "Teach the System" method to supply an alternative VisReqs set of query components that are successful. In 640, the UserQuery, in either case above, is posted on disk. The ultimate success of the NL Query product invention will depend on whether the ratio of "Successful attempts" vs. the "Total attempts" of NL Requests is high enough to satisfy its User Base.

Figure 7:
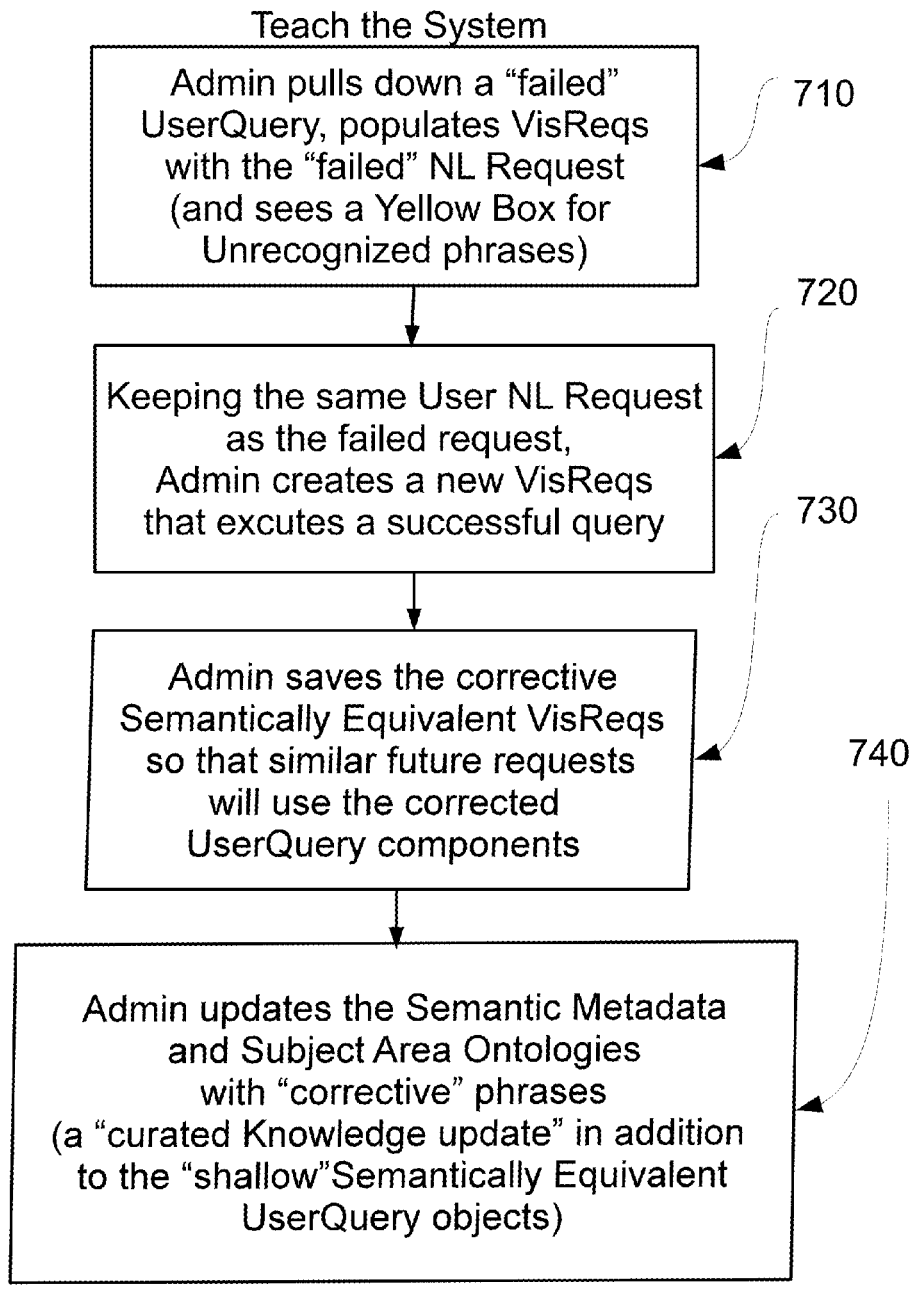
FIG. 7 (700) The "Teach the System" system component using the invention' hallmark "Visual Requirements Specification".

FIG. 7. (700): The "Teach the System" system component. As was explained above, a UserQuery record is created for every attempted User NL Request, whether it was successfully parsed, converted to a Database Query and its answer returned to the user or it was not successful, in which case the UserQuery is stored on disk so that an admin, at some future time, can "cure" this "failed request with tine invention's breakthrough technology of "Teaching the System". In 710 an admin selects a failed NL Request to start the curative process of "Teach the System". The act of selecting a failed UserQuery automatically populates a Visual Request Specification for the failed NL Request. The "Unrecognized" request phrases, highlighted as a "Yellow box", are shown in a textbox below the NL Request text itself. All of the known VisReqs components are automatically drag-dropped as Selected Item or Filtered Items in their respective VisReq panels for each type of VisReq component Item.

In 720, the admin keeps the same NL Request in its texbox, but commences to "fix" the failed UserQuery by adding or deleting a Selected Item or by adding/deleting a Filtered Item. The admin appends to the NL Request the symbols "::" and then supplies a new descriptive set of sentences phrases. Then the "Got It" button is pressed to create a database query and generate a "correct answer". In 730, the admin saves the "Semantically Equivalent" NL Request in a new UserQuery record, which is linked back to the "failed" UserQuery.

In (740), the admin performs a "curated Knowledge Update" process in which he or she locates the proper Ontology level and inserts a Semantic Phrase Synonym or a new "Action Phrase" to the SemanticMetadata repository. The whole purpose of the "Teach the System" invention is to greatly extend and improve the proficiency of the NLU for future User NL Request recognition.

Figure 8:
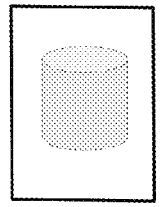
FIG. 8 (800) Providing "cross-data source" user requests by sending a single request to disparate database systems to simultaneously write their own SQL commands, and then collating the returning result-set objects.
Figure 8:
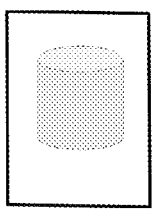
Figure 8:
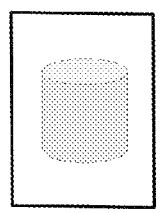

FIG. 8 (800): Retrieving answers from disparate data sources. As is the case for retrieving answers from a single data source, a User enters a NL Request (810). In (820) the system simultaneously sends the NL Request to a specified list of "Participating Database Systems" that have been set up to work with the invention. In (830), each participating Database System "writes its own SQL query" if it has any information pertaining to the NL Request.

In (840) each disparate Database System is set up with its own set of Rules to decide whether it can add valuable information to the NL Request and whether its Rules permit it to participate by sending its answer result-set objects back to a known "Staging Area" waiting to capture the returning answer fragments. In (850) the returning answer result-set objects are captured and collated into a single Answer, which then is returned to the User.

Figure 9:
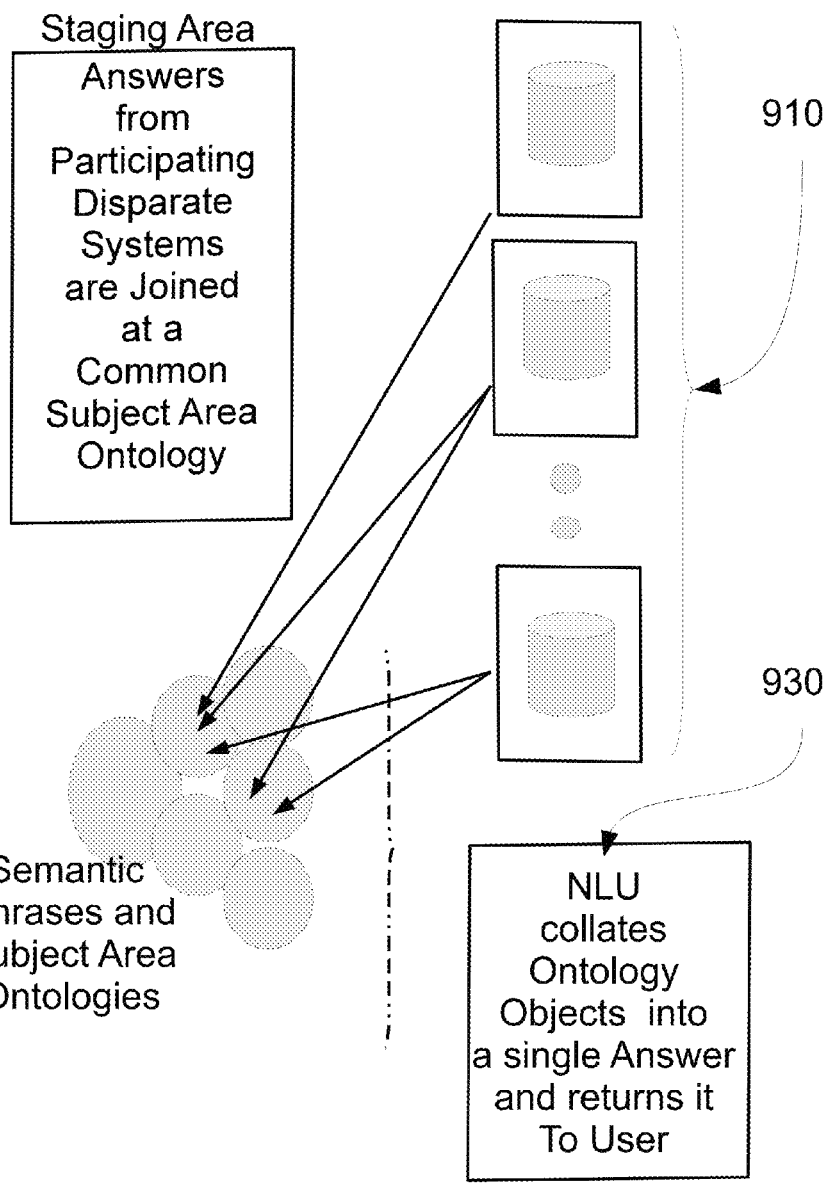
FIG. 9 (900) Cross joining disparate database result-set objects at "common Ontology levels".

FIG. 9 (900): Cross joining Result-set Objects, In (910) Participating Disparate Database Systems send their Result-set objects to the system's Staging Area. In (920) the incoming Result-set Objects being returned by Participating Disparate Database Systems are "JOINED", not by matching Primary Key/Foreign Key values as is done with conventional SQL commands but "conceptually" at Common Subject Area Ontology Entities/Attributes in the Ontology Taxonomy. Then at (930) the "joined" Entities and Attributes are bubbled up to mirrored ConceptMetadata objects to create the SQL command and return the query results to the User.

Figure 10:
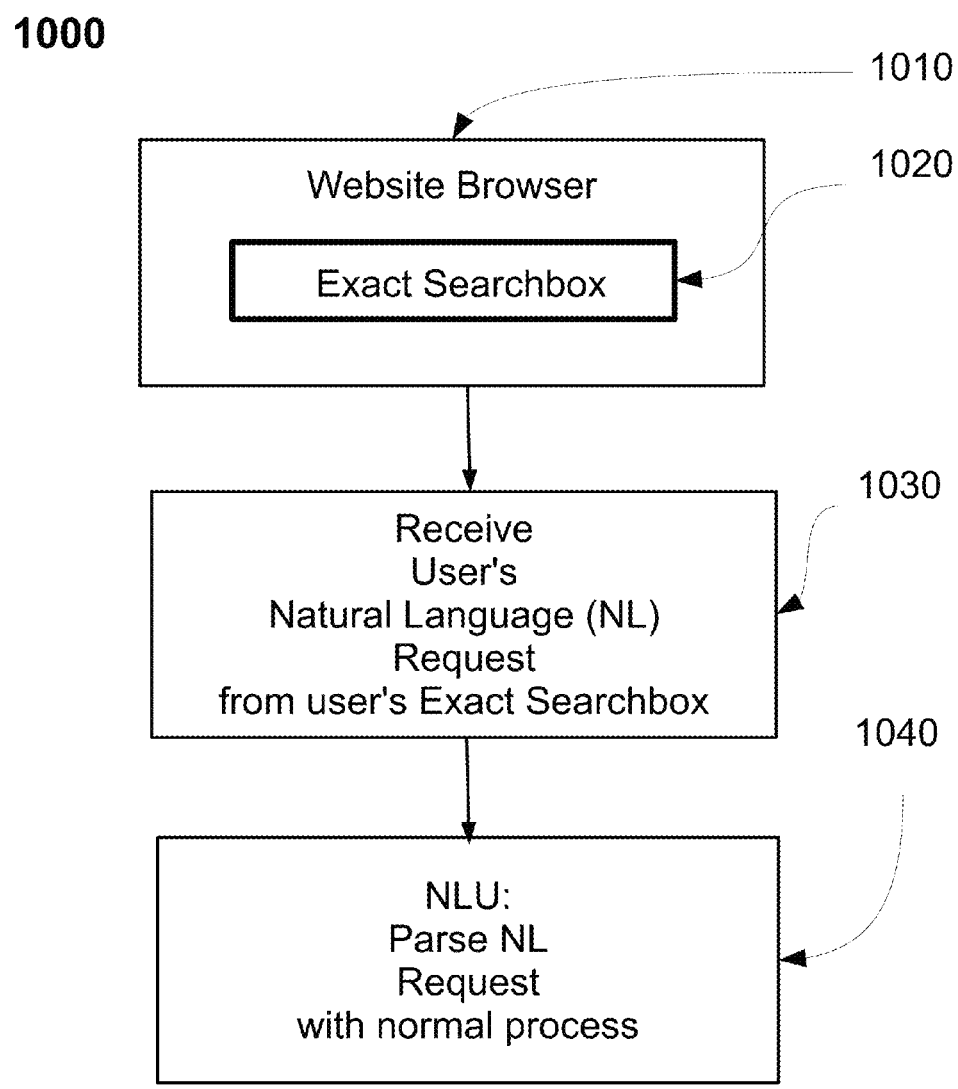
FIG. 10 (1000) The method by which regular website "search" textboxes are used as "Exact Searchboxes" to provide users and site visitors an ad hoc immediate-result alternative to the "drop-down" menus on the website.

FIG. 10 (1000): the "Exact Searchbox" embodiment of the invention. In (1010), a common website is indicated with (1020) a "search" textbox, commonly found on most websites, now renamed "Exact Searchbox" because it provides the website Users and Visitors an ad hoc immediate-answer function as a replacement for or an alternative search method for the "drop-down" menu hierarchies offered on most websites. In (1030) and (1040) normal system processing takes place and the answer is returned to the User. Early adopter clients who have tested out the invention or who have indicated they would like to implement the invention in their web database applications were the initiators of the idea of an Exact Searchbox as a "better search method" than their hierarchy of menu=driven "drop-down" select boxes.

Figure 11:
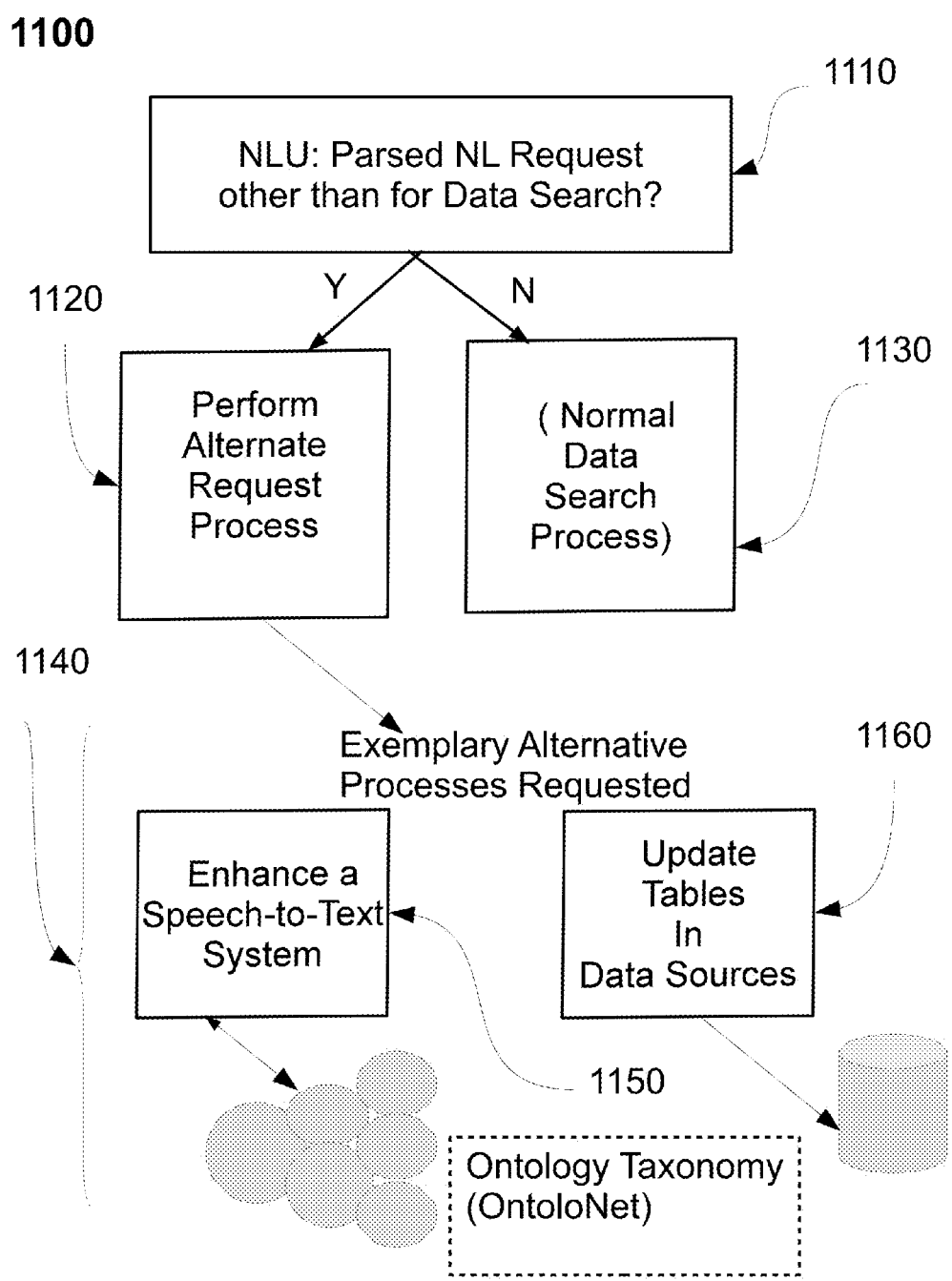
FIG. 11 (1100) The alternative embodiment of handling non-query requests.

FIG. 11 (1100): The alternative embodiment of handling non-query requests. In (1110) a User's NL Request is entered and determined by the NLU whether it is a Data Search request or some other type of request, in (1120) and (1130). Natural Language requests by users have been used for years for non-data search purposes, the most common purpose being the search by key words for getting links to documents that might provide an answer the user is looking for: which of course is what search engines like Google and Bing provide. Other non-database search user requests include "commands" (e.g., "turn on the light") and many other purposes.

The invention's utilization of a large set of known phrases in its Ontology Taxonomy (1150) provides a great opportunity to "make smartphones smarter", by enhancing the Speech-to-Text (STT) functionality (1140) provided on nearly all cellphones and tablet computers. STT systems work in a special world of interpreting the "phonemes" of the utterances of their device users. Their proficiency is, at the present state of the art, not especially good at successfully interpreting multi-phrase user statements or questions in noisy environments, and their success is also dependent to a large degree on whether they have been "trained" to understand the vernacular terms in a particular industry. Doctors use STT successfully because they have been trained in understanding common healthcare terms used by physicians.

STT systems normally are trained only for high-volume use cases, such as healthcare, but because of the wide variety of Subject Areas having their own "industry terms", and of course the much wider variance in the content of specific databases, even the most popular STT products on the market struggle with "untrained" subject areas. A case in point to illustrate how the invention can enhance the performance and accuracy of STT is the ability of an STT to recognize the common phrases of a sport like baseball. Common words that "sound alike" when spoken, such as "pitcher" in baseball being interpreted as the word "picture", will cause a sports fan who asks a baseball question on a smartphone to stop and use his or her keyboard to back up and correct the word. If on the other hand the STT "knew" that the user was asking a request about a Subject Area known to the invention's Ontology Taxonomy it could defer its final "guess" at the word and consult the inventions' OntoloNet for its interpretation of the word or phrase.

In (1160) another non-data search Use Case of the invention is for inputting and updating the content of databases.

I claim:

1. A computer-implemented method, comprising:

receiving, by a computer, a natural language request, said request comprises semantic phrases stated by voice or by text in plain English or other spoken or written language, wherein a plain meaning of a phrase consist of one word or contiguous words, and a term semantic asserting that a phrase has a different word meaning based on relevant context;

mapping, by a computer, a natural language request semantic phrases which are nouns to concept model objects stored in a hierarchical concept model repository part of a metadata repository database, resulting in a set of mapped concept model objects;

mapping, by a computer, said natural language request semantic phrases which are non-nouns against semantic phrases stored in a hierarchical semantic phrase repository part of the metadata repository database;

transforming, by a computer, mapped concept model objects into mapped database query objects by a natural language understanding process;

generating by a computer, an executable database query statement from the mapped database query objects in a suitable database query language;

opening a virtual private network connection between the metadata repository database and a single or federated database associated with a current concept model;

executing by a computer, the generated executable database query statement;

capturing by a computer, database query results of the executed database query statement and sending said database query results to a requesting user;

maintaining said metadata repository database, consisting of a public domain open source OntoloNet metadata repository, consisting of a hierarchical concept model repository, a hierarchical subject area repository, and a hierarchical semantic phrase repository, wherein said hierarchical concept model repository objects are mapped to subject area repository objects, said mapping is linked by identical object name;

said method further comprises a semantification process, comprising: creating by a computer, a concept model object which includes a data model object of structural elements of a single or federated relational database consisting of tables and table columns, wherein said table comprises column width and type, indexes and table relationships, wherein said concept model object components include adding by a computer, said created concept model object and all of said concept model object components to said hierarchical concept model repository portion of a metadata repository database;

creating by a computer, a subject area object and subject area object components, mapped by matching object name, to said concept model object and to said concept model object components;

adding by a computer, the created subject areas and subject area components to the hierarchical subject area repository portion of the meta data repository database repository;

converting by a computer, said mapped concept model object components, captured in a said natural language request, into visual requirement specification components;

mapping by a computer, said visual requirement specification components into database query components of the executable database query;

generating by a computer, a join clause of the executable database query statement by a navigation algorithm, executable by a computer processor, further comprising join clause components thereby forming an optimum path between the table relationships in the single or federated target databases;

discovering by a computer, a new non-noun phrase in a natural language request, and adding the discovered non-noun phrase to the semantic phrase repository portion of the metadata repository database repository;

replacing by a computer, visual request specification components of a failed user request user query of a user query database table by creating a user query, with a new set of semantically equivalent visual request specification components that map successfully to database query components of the executable database query, wherein replacement is characterized by a trained user, further comprising:

selecting by a computer, a failed user request user query from a database table of user query;

specifying by a computer, a new set of semantically equivalent visual request specification component;

employing a visual request specification process of selecting, using a visual drag-drop technique, database objects from a visible tree of entities and entity attributes, displaying said database objections from a visual request specification user interface page, to another section of the visual request specifications user interface page which contains selected visual request specification components, and setting visual request specification filter conditions, wherein each condition is composed of:

a selected Visual Request Specification component, a relational operation from a list of relational operations terms consisting of one or more of the following: equals, greater than, less than, is null, and is not null;

a user-specified value or another selected visual request specification component;

generating and executing by a computer processor, a database query with the replacement visual request specification components and filter conditions specified by the trained user;

storing the database query as a defined query;

creating by a computer, a user query request further comprising:

capturing by a computer, the visual request specification components of each natural language request as a user request in a user query database table, said user query request is one of the following:

successfully processed as the executable database query, or said user query request is failed;

and sending, by a computer, a code wherein said code indicates a reason for the failed user query request.

* * * * *